United States Patent [19]

Drori

[11] 4,173,309
[45] Nov. 6, 1979

[54] FLOW CONTROL DEVICES PARTICULARLY USEFUL FOR DRIP IRRIGATION

[76] Inventor: Mordeki Drori, 89 Zahal St., Kiron, Israel

[21] Appl. No.: 859,100

[22] Filed: Dec. 9, 1977

[30] Foreign Application Priority Data

Dec. 10, 1976 [IL] Israel ........................................ 51080

[51] Int. Cl.² ............................................. B05B 15/02
[52] U.S. Cl. .................................... 239/542; 239/547; 239/107
[58] Field of Search ............... 239/542, 545, 571, 547, 239/450, 145, 107; 61/12, 13; 138/42, 44, 45, 46; 285/13, 14, DIG. 22

[56] References Cited

U.S. PATENT DOCUMENTS

| 3,567,134 | 3/1971 | Smith | 239/547 |
| 3,896,999 | 7/1975 | Barragan | 239/542 |
| 4,058,257 | 11/1977 | Spencer | 239/107 |

Primary Examiner—James B. Marbert
Attorney, Agent, or Firm—Benjamin J. Barish

[57] ABSTRACT

Fluid flow control devices are described particularly useful as drip irrigation emitters provided with flow regulation to reduce their pressure-sensitivity, thereby enabling them to be used in long lines and in undulating terrain. The disclosed devices include a first flexible plastic strip bonded on one surface to a second plastic strip along bond lines defining a pressure-dropping passageway. A third plastic surface is bonded to the opposite surface of the first flexible plastic strip along bond lines defining therewith a static pressure chamber in which the first flexible plastic serves as a common wall with the chamber and the passageway for at least part of the length of the passageway. Thus variations in the velocity of the fluid through the pressure-dropping passageway causes the common wall to be flexed to vary the cross-sectional area of the passageway and thereby to regulate the fluid flow therethrough. Both linear-source emitters and point-source emitters are described.

21 Claims, 25 Drawing Figures

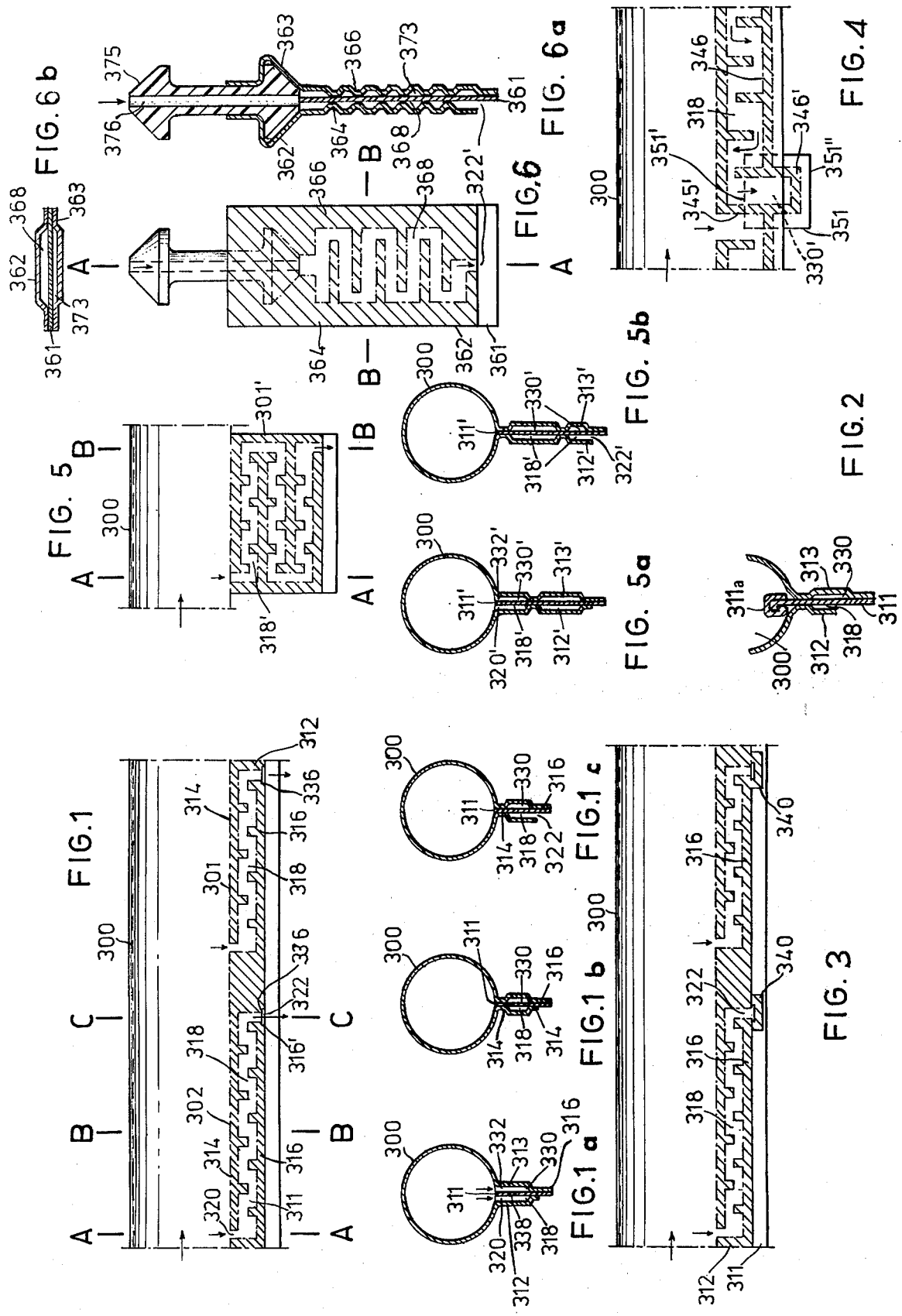

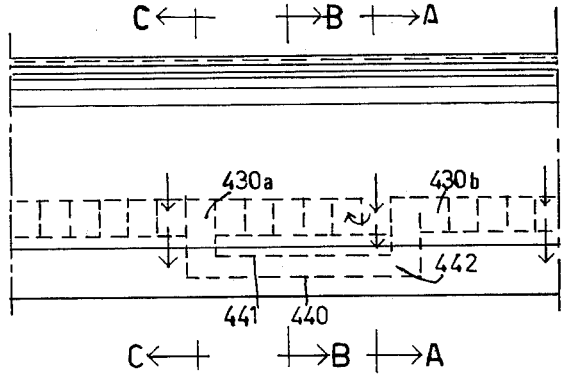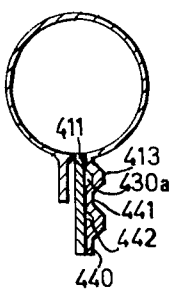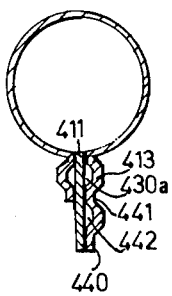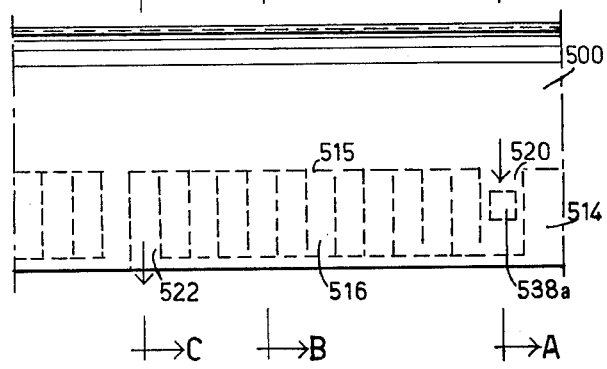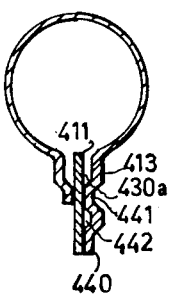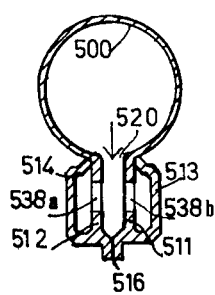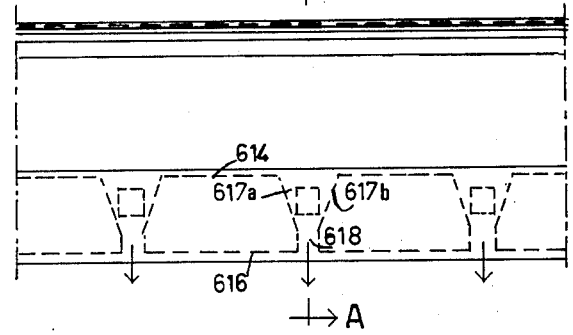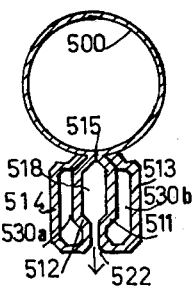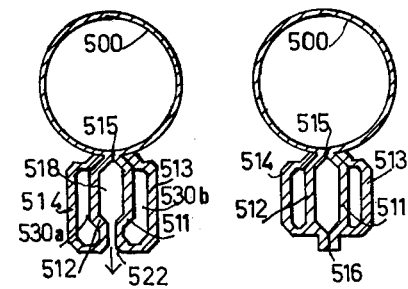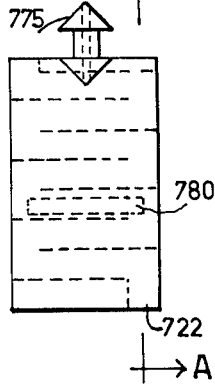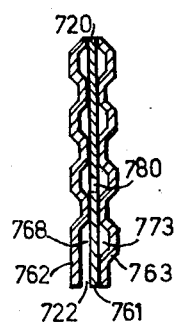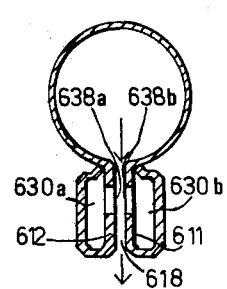

FLOW CONTROL DEVICES PARTICULARLY USEFUL FOR DRIP IRRIGATION

RELATED APPLICATIONS

This application is related to my copending application Ser. No. 715,550 filed Aug. 18, 1976 titled "Fluid Flow Control Devices Particularly Useful in Drip Irrigation".

BACKGROUND OF THE INVENTION

The invention relates to fluid flow control devices. The invention is particularly useful in producing drip irrigation emitters, and is therefore described below with respect to this application.

One of the newest and most rapidly developing techniques for irrigating plants is by drip irrigation, in which emitters connected to water conduits are used for supplying a continuous, slow trickle of water to the plants. Most of the known systems use individual emitters, known as point-source emitters, individually coupled to the water conduits at longitudinally spaced points. Also known are linear-source emitters in which the water conduit itself is provided with a plurality of emitter openings spaced longitudinally of the conduit.

My above-cited application Ser. No. 715,550 discloses fluid flow control devices particularly useful as drip irrigation emitters of the type including a flexible plastic strip bonded on one surface to a second plastic surface along bond lines defining therebetween a pressure-dropping passageway having an inlet at one end for receiving pressurized fluid from a conduit, and an outlet at the opposite end for outletting the fluid at a low flow rate.

SUMMARY OF THE PRESENT INVENTION

The present invention is directed to fluid flow control devices of the foregoing type to provide flow regulation of the fluid outputted by the device.

According to the present invention, there is provided a fluid flow control device particularly useful as a drip irrigation emitter comprising a first flexible plastic strip bonded on one surface to a second plastic surface along bond lines defining therewith a pressure-dropping passageway having an inlet at one end for receiving pressurized fluid from a conduit and an outlet at the opposite end for outletting the fluid, characterized in that the device includes a further plastic surface, bonded to the opposite surface of the first flexible plastic strip along bond lines defining therewith a static pressure chamber in which the first flexible plastic strip serves as a common wall with said chamber and said passageway, the static pressure chamber having an inlet at one end for receiving pressurized fluid from the conduit, whereby variations in the velocity of the fluid through said passageway causes said common wall to be flexed to vary the cross-sectional area of the passageway and thereby to regulate the fluid flow therethrough.

It will thus be seen that the present invention regulates fluid flow by utilizing the "Bernoulli effect", namely, the phenomenon of internal pressure reduction with increased stream velocity in a fluid. Thus, the flexible common wall is subjected, on one face, to the inlet pressure from the static pressure chamber, and on the opposite face to the internal pressure of the fluid within the passageway which internal pressure varies with fluid velocity. Accordingly, if the fluid flow increases, the internal pressure in the passageway drops, thereby causing the pressure on the opposite face of the flexible common wall, namely that of the static pressure chamber, to deflect the common wall such as to reduce the cross-sectional area of the passageway and thereby to reduce the fluid flow.

According to the preferred embodiments of the invention described in the present application, the second plastic surface is a second flexible plastic strip bonded to one face of the first flexible plastic strip and forming said pressure-dropping passageway therewith; and the further plastic surface is a third flexible plastic strip bonded to the opposite face of the first strip and forming the static pressure chamber therewith.

Several linear-source emitter embodiments of the invention are described below wherein the device further includes a conduit formed of flexible plastic material, the first, second and third plastic strips constituting the lapped ends in a seam of the conduit bonded by said bond lines, the bond lines having a gap providing communication between the interior of the conduit and the inlets of the pressure-dropping passageway and the static pressure chamber formed in said seam.

Point-source emitter embodiments of the invention are also described wherein the device includes a connector attached to the device at the inlets of the pressure-dropping passageway and static pressure chamber for connecting both to a conduit.

The first, second and third flexible plastic strips may all be made of the same material heat-bondable to each other.

However, the invention may also advantageously be used wherein the second and third flexible plastic strips are made of the same material, and the first flexible plastic strip is made of a different material which produces a strong bond with the material of the second and third flexible plastic strips. This feature enables strong inexpensive materials to be used for the second and third strips, and to be strongly bonded by the use of a material for the first strip which produces both a strong bond with the latter materials, and also a very flexible or pliable common wall between the static chamber and the pressure-dropping passageway.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a plan view illustrating one form of linear-source drip emitter device constructed in accordance with the present invention, FIGS. 1a, 1b and 1c being sectional views along lines A—A, B—B, and C—C, respectively;

FIGS. 2–5 illustrate variations of the drip emitter of FIG. 1, FIGS. 5a and 5b being sectional views along lines A—A and B—B of FIG. 5;

FIG. 6 illustrates the invention embodied in a point-source emitter for attachment to a conduit, FIGS. 6a and 6b being sectional views along lines A—A and B—B of FIG. 6.

FIG. 7 illustrates a variation in the linear-source emitter of FIG. 3, FIGS. 7a, 7b, 7c being transverse sectional views along lines A—A, B—B, and C—C, respectively, of FIG. 7;

FIG. 8 illustrates a further variation of the linear-source emitter, FIGS. 8a, 8b, and 8c being transverse sectional views along lines A—A, B—B, and C—C of FIG. 8;

FIG. 9 illustrates a variation in the emitter of FIG. 6, FIG. 9a being a sectional view along lines A—A of FIG. 9; and FIG. 10 illustrates a further point-source emitter, FIG. 10a being a section along lines A—A of FIG. 10.

DESCRIPTION OF SEVERAL PREFERRED EMBODIMENTS

The device in FIG. 1 is a linear-source emitter made by bonding, in the manner described in the above-cited copending patent application, two end strips 312, 313 (FIGS. 1a–1c) of a flexible plastic sheet along bond lines 314, 316, to define a conduit 300 and a seam including a pressure-dropping passageway 318 having an inlet 320 and an outlet 322. In this case, however, an additional strip 311 of flexible plastic sheet material is inserted between the two end strips 312, 313 before they are bonded together by the plastic-welding dies. Thus, when the dies are applied, the inner face of strip 312 is bonded to one face of strip 311 along the bond lines 314, 316, and the inner face of strip 313 is bonded to the opposite face of strip 311 along the same bond lines.

Accordingly, the intermediate strip 311 (hereinafter sometimes referred to as the first strip) is bonded to one face to strip 312 (hereinafter sometimes referred to as the second strip) along bond lines 314, 316, forming with the latter strip the pressure-dropping passageway 318, which passageway has an inlet 320 (FIG. 1a) communicating with the interior of conduit 300, and an outlet 322 (FIG. 1c).

The intermediate or first strip 311 is also bonded, on its opposite face, to strip 313 (hereinafter sometimes referred to as the third strip) along the same bond lines 314, 316, forming a chamber 330 having, at one end, an inlet 322 (FIG. 1a) communicating with the interior of conduit 300, but closed at its opposite end by bond line 316, as shown in FIG. 1c. Chamber 330 thus acts as a static pressure chamber having an internal pressure equal to the pressure within conduit 300 at the location of the particular drip emitter element 301, 302.

The intermediate strip 311 serves as a common wall between the static pressure chamber 330 and the passageway 318 for the complete length of the latter passageway. This common wall, being of flexible plastic material, will be deflected to decrease or increase the cross-section area of passageway 318 according to the pressure differential on its opposite faces. The pressure on the chamber 313 side of wall 311 is constant, and depends on the pressure of the fluid at that particular location within conduit 300, which pressure is transmitted to chamber 330 via inlet gap 332. On the other hand, the pressure on the passageway 318 side of the wall 311 varies with variations in the velocity of the fluid flowing through the passageway in accordance with the "Bernoulli effect". Thus, an increase in the flow rate causes a reduction in the passageway pressure and thereby a deflection of the common wall 311 into the passageway, restricting its cross-sectional area and reducing the flow rate of the fluid therethrough. Accordingly, the output of each of the drip emitter elements 301, 302, etc. along the conduit will remain substantially constant notwithstanding variations in the pressure of the water within the conduit at the particular location of the emitter element.

Strip 312 is of shorter width than the two strips 311 and 313. Strip 311 is first continuously bonded along its outer edge to strip 313 to produce bond line 316 (FIGS. 1a–1c), and is then bonded to strip 312 along upper bond line 314 having the inlet gaps 320 and along the lower bond line 316 having gaps 336. Thus, the passageway 318 between strips 312 and 311 will be open (FIG. 1c) to permit the emission of the water, whereas the corresponding end of chamber 330 between strips 311 and 313 will be closed to provide the static pressure chamber for effecting the flow regulation through outlet 322 of the passageway 318.

Preferably, strip 311 includes an opening 338 (FIG. 1a) at the inlet ends 320 332 of the passageway 318 and chamber 330, respectively, to assure that the water from conduit 300 will enter both the passageway and the chamber.

FIG. 2, which is a fragmentary view corresponding to FIG. 1c, illustrates a variation wherein, instead of including opening 338 in strip 311, the latter is folded or lapped at its inner edge, as shown at 311a, to provide a thickened edge which assures the communication between conduit 300, passageway 318, and chamber 330.

FIG. 3 illustrates a slight variation. Instead of using the above-described two-step bonding process to produce the open outlet 322 in passageway 318 and the closed end of the static pressure chamber 330, the three strips are bonded at one time, but a ridge 340 is provided in bond line 316, the ridge being below the lower edge of strip 212 so that it closes the end of the static chamber between strips 311 and 313, but leaves open the end of the passageway between strips 311 and 312.

FIG. 4 illustrates a further variation wherein the intermediate strip (311 in the FIG. 1 emnbodiment) does not extend for the complete length of the seam, but rather is provided only at the outlet end of the passageway 318, as shown at 351. Its upper edge 351' is below the upper edge of the last two transverse bond lines 345' defining the outlet end of the pressure-dropping passageway 318, and its lower edge 351" is below the outlet end section 346' of the outer bond line 346. Thus, a static pressure chamber 330' is formed only co-extensive with the last leg of the pressure-dropping passageway 318, this chamber being opened to the conduit 300 at its inner end, and being closed at its outer end by bond line 346'. Obviously, strip 351 could extend for two or more of the end legs in the passageway.

FIG. 5 illustrates a still further variation, wherein the drip emitters 301' (only one being shown) are formed with pressure-dropping passageways 318' having two (or more) legs or loops between the bonded seam strip 312', and the intermediate strip 311'. As in the above described embodiments, the bond lines are applied so as to form the gap defining the passageway inlet 320' (FIG. 5a) communicating with the interior of conduit 300, and the passageway outlet 322' (FIG. 5b). It will be appreciated that the static pressure chamber 330' produced between strips 311' and 313' will be co-extensive with the fluid passageway 318', as in FIGS. 1–3, chamber 330' being open at the inlet 332' (FIG. 5a) end to provide communication with the interior of conduit 300, and being closed at the opposite end (FIG. 5b).

FIGS. 6, 6a and 6b show how the invention could also be advantageously used in producing point-source emitters individually attached to the conduit by connectors. Thus, each emitter is formed of three flexible plastic strips, namely the two outer strips 362, 363, and the inner strip 361, bonded together along bond lines 364, 366 to define the pressure-dropping passageway 368 between strips 361, 362 and the static pressure chamber 373 between strips 361 and 363. A connector 375 is inserted into the inlet end of the emitter and includes a bore 376 to provide communication between the conduit into which the drip emitter is inserted and the inlet end of the pressure-reducing passageway 368, as well as the inlet end of the static pressure chamber 373. The opposite end of the emitter is constructed as described above with respect to FIG. 1, to open the outlet end 322' of the passageway 368 and to close the corresponding end of the static pressure chamber 373.

The device illustrated in FIG. 7 (and its sectional views FIGS. 7a, 7b, 7c) is similar to that of FIG. 3, except that instead of one bond line (340) applied between the first plastic strip (311) and third plastic strip (313), there are provided two spaced bond lines 440, 441 which define a passageway 442 providing communication between the outlet end of one static chamber (430a) between the strips 411, 413, and the inlet end of the next static chamber (430b).

FIGS. 8 and 9 (including their respective sectional views FIGS. 8a–8c and 9a) illustrate a still further variation wherein two static chambers are formed, one on each side of the pressure-dropping passageway.

Thus, as shown particularly in FIGS. 8a–8c, the device includes a fourth plastic strip 514 adjacent to, and joined continuously along, the bottom of the second plastic strip 512. The first plastic strip 511 is also joined continuously along the bottom of the third plastic strip 514. This arrangement may be conveniently provided by folding over the two lapped ends of the plastic strip used for making the conduit 500 and the seam, so that one folded end defines the two adjacent plastic strips 512, 514, and the other folded end defines the two adjacent plastic strips 511, 514. Now if all four plastic strips are bonded along the upper bond lines 515 provided with the inlet gaps 520, and the lower bond lines 516 provided with the outlet gaps 522, it will be seen that: a pressure-dropping passageway 518 is formed between plastic strips 511 and 512; one static chamber 530a is formed on one side of the passageway 518 between strips 512 and 514; and a second static chamber 530b is formed on the other side of passageway 518 between strips 511 and 513. To assure communication between the inlets of the two static chambers and the pressure-dropping passageway, the inner strips 511 and 512 are preferably formed with openings 538a and 538b (FIG. 8a), respectively, near their inlet ends.

FIGS. 9, 9a illustrate a modification in the device of FIG. 8 wherein the pressure-dropping passageway is a short single-leg one rather than a meandering or multiple-leg one. Thus, the transverse bond lines 617a, 617b define a converging single-leg passageway 618 between the two inner strips 611, 612, which strips are provided with openings 628, 638b near the inlet to apply the inlet pressure to the two static chambers on opposite side of the passageway. It will be appreciated that water does not enter the seam between the passageways 618 by virtue of the longitudinal bond lines 614, 616 which are provided with gaps only at the transverse bond lines 617a, 617b.

It will also be appreciated that the same four-strip double-static-chamber arrangement can be used in the point-source emitter, e.g. of FIG. 6.

FIG. 10 illustrates a further variation particularly useful in the point-source emitter construction. The device of FIG. 10 is similar to that of FIG. 6 in that it includes the three plastic strips 761, 762, 763 bonded together along bond lines defining a pressure-dropping passageway 768 between strips 761 and 762, and a static pressure chamber 773 between strips 761 and 761. However, in this construction, the inlet end of the static chamber 773 communicates with passageway 768 via an opening 780 formed in the inner strip 761. The inlet end 720 and the outlet end 722 of passageway 768 are open, whereas the two ends of the static chamber 773 are closed. Accordingly, the pressure in the static chamber will be determined by the location of opening 780 in the middle strip 761. Since the pressure in the static chamber is a factor determining the degree passageway 768 will be varied with pressure, the output rate of the emitter can be fixed by merely providing the middle strip 761 with the opening 780 at the appropriate location. This substantially simplified the production of emitters for different flow rates.

It will be appreciated that the foregoing feature of FIG. 10 could also be used in the linear-source emitter constructions and in the double-static-chamber constructions described above. It will also be appreciated that the double-static chamber constructions could use four separate strips, the two inner strips being continuously bonded at their lower edges to their respective outer strips, with the upper edges of the inner strips being formed with the folded ends as shown at 311a in FIG. 2 to assure communication between the interior of the conduit, the passageway, and the two static chambers on opposite sides of the passageway.

Examples of flexible plastic strip material that could be used are polythylene, polyvinyl chloride, chlorinated polyethylene, polyvinylidene chloride, and various blends thereof. The intermediate strips should be very pliable and could be selected of a material strongly bondable to the outer strips; examples of such materials include polyvinylidene chloride for the inner strip and polyethylene, PVC, or nylon-reinforced PVC for the outer strips. The strip materials preferably would be in the form of sheets as described above, but could be originally in the form of thin tubular extrusions subsequently bonded along one edge to form the seam, with the intermediate strips being inserted into the tubular extrusion before the bonding step.

Many other variations and applications of the invention will be apparent.

What is claimed is:

1. A fluid flow control device particularly useful as a drip irrigation emitter comprising a first flexible plastic strip bonded on one surface to a second plastic surface along bond lines defining therewith a pressure-dropping passageway having an inlet at one end for receiving pressurized fluid from a conduit and an outlet at the opposite end for outletting the fluid, characterized in that the device includes a further plastic surface bonded to the opposite surface of said first flexible plastic strip along bond lines defining therewith a static pressure chamber in which said first flexible plastic strip serves as a common wall with said chamber and said passageway for at least a pair of the length of said passageway, said static pressure chamber having an inlet at one end for receiving pressurized fluid from the conduit whereby variations in the velocity of the fluid through said passageway causes said common wall to be flexed to vary the cross-sectional area of the passageway and thereby to regulate the fluid flow therethrough.

2. A device according to claim 1, wherein said second plastic surface is a second flexible plastic strip bonded to one face of the first flexible plastic strip and forming said pressure-dropping passageway therewith.

3. A device according to claim 2, wherein said further plastic surface is a third flexible plastic strip bonded to the opposite face of the first strip and forming the static pressure chamber therewith.

4. A device according to claim 3, wherein said third strip is bonded to said first strip along bond lines such that the static pressure chamber extends substantially the complete length of the pressure-dropping passageway.

5. A device according to claim 3, wherein said third strip is bonded to said first strip along bond lines such that the static pressure chamber extends only along a portion of the pressure-dropping passageway.

6. A device according to claim 3, wherein said first flexible plastic strip includes an opening providing communication between the inlet ends of said pressure-dropping passageway and said static pressure chamber.

7. A device according to claim 3, further including a conduit formed of flexible plastic material, the first, second and third plastic strips constituting the lapped ends in a seam of said conduit bonded by said bond lines, said bond lines having a gap providing communication between the interior of the conduit and the inlets of the pressure-dropping passageway and the static pressure chamber formed in said seam.

8. A device according to claim 7, wherein said bond lines include a plurality of said gaps longitudinally spaced along the seam, the lapped ends of the seam being bonded to form a plurality of drip emitters each including one of said pressure-dropping passageways and static pressure chambers having inlets communicating with the interior of the conduit via one of said gaps.

9. A device according to claim 3, wherein said second flexible plastic strip is of shorter width than said first and third flexible plastic strips, and wherein the bond lines between the first and second flexible strips are the same as between the first and third flexible plastic strips, such that the bond lines produce an outlet opening in the passageway between the first and second flexible plastic strips but not in the static pressure chamber between the first and third flexible plastic strips.

10. A device according to claim 3, further including a connector attached to the device at the inlets of the pressure-dropping passageway and static pressure chamber for connecting both to a conduit.

11. A device according to claim 3, wherein the first, second and third flexible plastic strips are all made of made of the same material heat-bondable to each other.

12. A device according to claim 3, wherein the second and third flexible plastic strips are made of the same material, and the first flexible plastic strip is made of a different material which produces a strong bond with the material of the second and third flexible plastic strips.

13. A device according to claim 9, wherein said bond lines applied between said first and third plastic strips further define a communication pathway between the outlet end of one static chamber and the inlet end of another static chamber.

14. A device according to claim 3, further including a fourth plastic strip continuously bonded to the bottom of the third plastic strip and facing outwardly thereof, said bond lines thereby defining said pressure-dropping passageway between the second and third plastic strips and a static chamber on each side of the pressure-dropping passageway, one static chamber being defined by the first and third plastic strips, and the other static chamber being defined by the second and fourth plastic strips.

15. A device according to claim 3, wherein the bond lines define a plural-leg pressure-dropping passageway between the first and second plastic strips.

16. A device according to claim 3, wherein the bond lines define a single-leg pressure-dropping passageway between the first and second plastic strips.

17. A device according to claim 3, wherein said first plastic strip is formed with an inlet opening at a preselected intermediate location of the pressure-dropping passageway, to fix the pressure in the static chamber as that in the pressure-dropping passageway at said preselected opening.

18. A fluid flow control device particularly useful as a drip irrigation emitter comprising: a first flexible plastic strip of uniform thickness throughout its length and width, said first strip being bonded on one surface to a second flexible plastic strip, and on the opposite surface to a third flexible plastic strip both along bond lines defining a pressure-dropping passageway between the first and second flexible plastic strips, said bond lines having a gap at one end of the passageway defining an inlet for receiving pressurized fluid from a conduit, and a gap at the opposite end of the passageway defining a outlet for the fluid, said second and third flexible plastic strips being made of the same material, and said first flexible plastic strip being made of a different material which produces a strong bond with the material of the second and third flexible plastic strips.

19. A device according to claim 18, wherein the thickness of the first flexible plastic strip is no greater than that of the second and third flexible plastic strips, and the bond lines between said first and third flexible plastic strips define a static pressure chamber having an inlet at one end for receiving pressurized fluid from the conduit and being closed at the opposite end, said first flexible plastic strip serving as a common wall between said static pressure chamber and said passageway.

20. The device according to claim 19, further including a conduit formed of flexible plastic material, the first, second and third flexible plastic strips constituting the lapped ends in a seam of said conduit bonded by said bond lines, said bond lines having a gap providing communication between the interior of the conduit and the inlet of the pressure-dropping passageway and of the static pressure chamber formed in said seam.

21. The device according to claim 19, further including a connector attached to the device at the inlet of the pressure-dropping passageway and static pressure chamber for connecting both to a conduit.

* * * * *